United States Patent
Le et al.

(10) Patent No.: US 9,472,242 B1
(45) Date of Patent: Oct. 18, 2016

(54) HARD DISK DRIVE ENCLOSURE BASE WITH FEED THROUGH FLEXURE DESIGN AND ACCOMPANYING FLEXURE

(71) Applicant: Western Digital Technologies, Inc., Irvine, CA (US)

(72) Inventors: Lynn Bich-Quy Le, San Jose, CA (US); Thomas J. Hitchner, San Martin, CA (US)

(73) Assignee: WESTERN DIGITAL TECHNOLOGIES, INC., Irvine, CA (US)

(*) Notice: Subject to any disclaimer, the term of this patent is extended or adjusted under 35 U.S.C. 154(b) by 0 days.

(21) Appl. No.: 14/843,911

(22) Filed: Sep. 2, 2015

Related U.S. Application Data

(60) Provisional application No. 62/171,848, filed on Jun. 5, 2015.

(51) Int. Cl.
*G11B 33/12* (2006.01)

(52) U.S. Cl.
CPC ............. *G11B 33/12* (2013.01); *G11B 33/122* (2013.01); *G11B 33/126* (2013.01)

(58) Field of Classification Search
None
See application file for complete search history.

(56) References Cited

U.S. PATENT DOCUMENTS

| | | | |
|---|---|---|---|
| 5,235,482 A | 8/1993 | Schmitz | |
| 5,357,386 A * | 10/1994 | Haidari et al. | 360/99.18 |
| 5,454,157 A | 10/1995 | Ananth et al. | |
| 5,491,300 A | 2/1996 | Huppenthal et al. | |
| 5,780,771 A * | 7/1998 | Beckwith et al. | 174/17.08 |
| 5,953,183 A | 9/1999 | Butler et al. | |
| 6,046,889 A | 4/2000 | Berding et al. | |
| 6,052,890 A | 4/2000 | Malagrino, Jr. et al. | |
| 6,061,206 A | 5/2000 | Foisy et al. | |
| 6,101,876 A | 8/2000 | Brooks et al. | |
| 6,135,782 A * | 10/2000 | Cox et al. | 439/65 |
| 6,147,831 A | 11/2000 | Kennedy et al. | |
| 6,151,189 A | 11/2000 | Brooks | |
| 6,151,197 A | 11/2000 | Larson et al. | |
| 6,185,067 B1 | 2/2001 | Chamberlain | |
| 6,185,074 B1 | 2/2001 | Wang et al. | |
| 6,200,142 B1 | 3/2001 | Soh | |
| 6,208,486 B1 | 3/2001 | Gustafson et al. | |
| 6,215,616 B1 | 4/2001 | Phan et al. | |
| 6,272,694 B1 | 8/2001 | Weaver et al. | |
| 6,288,866 B1 | 9/2001 | Butler et al. | |
| 6,292,333 B1 | 9/2001 | Blumentritt et al. | |
| 6,344,950 B1 | 2/2002 | Watson et al. | |
| 6,349,464 B1 | 2/2002 | Codilian et al. | |
| 6,388,873 B1 | 5/2002 | Brooks et al. | |
| 6,417,979 B1 | 7/2002 | Patton, III et al. | |
| 6,421,208 B1 | 7/2002 | Oveyssi | |
| 6,441,998 B1 | 8/2002 | Abrahamson | |
| 6,462,914 B1 | 10/2002 | Oveyssi et al. | |

(Continued)

*Primary Examiner* — Carlos E Garcia

(57) ABSTRACT

A storage base having an interior side and an exterior side is described. The storage drive base includes a slotted aperature, a flexible circuit and a sealing-adhesive barrier. The slotted aperature passes through the storage drive base from the interior side to the exterior side. The flexible circuit has a first end and a second end. The first end of the flexible circuit is installed in the slotted aperture and aligned so that the first end extends along an interior surface of the storage drive base in a location proximal to the slotted aperture. The sealing-adhesive barrier is applied between edges of the slotted aperture and the flexible circuit to form a hermetic seal between the exterior side and the interior side of the storage drive base.

18 Claims, 8 Drawing Sheets

(56) References Cited

U.S. PATENT DOCUMENTS

| | | |
|---|---|---|
| 6,466,398 B1 | 10/2002 | Butler et al. |
| 6,469,871 B1 | 10/2002 | Wang |
| 6,485,310 B2 | 11/2002 | Soh |
| 6,502,300 B1 | 1/2003 | Casey et al. |
| 6,519,116 B1 | 2/2003 | Lin et al. |
| 6,529,345 B1 | 3/2003 | Butler et al. |
| 6,529,351 B1 | 3/2003 | Oveyssi et al. |
| 6,535,358 B1 | 3/2003 | Hauert et al. |
| 6,545,382 B1 | 4/2003 | Bennett |
| 6,549,381 B1 | 4/2003 | Watson |
| 6,560,065 B1 | 5/2003 | Yang et al. |
| 6,571,460 B1 | 6/2003 | Casey et al. |
| 6,574,073 B1 | 6/2003 | Hauert et al. |
| 6,580,574 B1 | 6/2003 | Codilian |
| 6,594,111 B1 | 7/2003 | Oveyssi et al. |
| 6,603,620 B1 | 8/2003 | Berding |
| 6,618,222 B1 | 9/2003 | Watkins et al. |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,654,200 B1 | 11/2003 | Alexander et al. |
| 6,657,811 B1 | 12/2003 | Codilian |
| 6,661,597 B1 | 12/2003 | Codilian et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,322 B2 * | 11/2005 | Bernett ............... 360/99.18 |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,493 B2 | 1/2006 | Hipwell, Jr. et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,019,942 B2 | 3/2006 | Gunderson et al. |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,113,371 B1 | 9/2006 | Hanna et al. |
| 7,123,440 B2 | 10/2006 | Albrecht et al. |
| 7,137,196 B2 | 11/2006 | Gunderson et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et |
| 7,215,513 B1 | 5/2007 | Chang et al. |
| 7,215,514 B1 | 5/2007 | Yang et al. |
| 7,224,551 B1 | 5/2007 | Ou-Yang et al. |
| D543,981 S | 6/2007 | Diebel |
| 7,227,725 B1 | 6/2007 | Chang et al. |
| 7,239,475 B1 | 7/2007 | Lin et al. |

(56) References Cited

U.S. PATENT DOCUMENTS

| | | |
|---|---|---|
| 7,271,978 B1 | 9/2007 | Santini et al. |
| 7,274,534 B1 | 9/2007 | Choy et al. |
| 7,280,311 B1 | 10/2007 | Ou-Yang et al. |
| 7,280,317 B1 | 10/2007 | Little et al. |
| 7,280,319 B1 | 10/2007 | McNab |
| 7,292,406 B1 | 11/2007 | Huang |
| 7,298,584 B1 | 11/2007 | Yamada et al. |
| 7,327,537 B1 | 2/2008 | Oveyssi |
| 7,339,268 B1 | 3/2008 | Ho et al. |
| 7,342,746 B1 | 3/2008 | Lin |
| RE40,203 E | 4/2008 | Hatch et al. |
| 7,353,524 B1 | 4/2008 | Lin et al. |
| 7,369,368 B1 | 5/2008 | Mohajerani |
| 7,372,670 B1 | 5/2008 | Oveyssi |
| 7,375,929 B1 | 5/2008 | Chang et al. |
| 7,379,266 B1 | 5/2008 | Ou-Yang et al. |
| 7,381,904 B1 | 6/2008 | Codilian |
| 7,385,784 B1 | 6/2008 | Berding et al. |
| 7,388,731 B1 | 6/2008 | Little et al. |
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,477,488 B1 | 1/2009 | Zhang et al. |
| 7,477,489 B1 | 1/2009 | Chen et al. |
| 7,484,291 B1 | 2/2009 | Ostrander et al. |
| 7,505,231 B1 | 3/2009 | Golgolab et al. |
| 7,529,064 B1 | 5/2009 | Huang et al. |
| 7,538,981 B1 | 5/2009 | Pan |
| 7,561,374 B1 | 7/2009 | Codilian et al. |
| 7,567,410 B1 | 7/2009 | Zhang et al. |
| 7,576,955 B1 | 8/2009 | Yang et al. |
| 7,593,181 B1 | 9/2009 | Tsay et al. |
| 7,599,147 B2 | 10/2009 | Gunderson |
| 7,605,999 B1 | 10/2009 | Kung et al. |
| 7,609,486 B1 | 10/2009 | Little |
| 7,610,672 B1 | 11/2009 | Liebman |
| 7,633,721 B1 | 12/2009 | Little et al. |
| 7,633,722 B1 | 12/2009 | Larson et al. |
| 7,656,609 B1 | 2/2010 | Berding et al. |
| 7,660,075 B1 | 2/2010 | Lin et al. |
| 7,672,083 B1 | 3/2010 | Yu et al. |
| 7,684,146 B1 * | 3/2010 | Andrikowich et al. ... 360/99.21 |
| 7,684,155 B1 | 3/2010 | Huang et al. |
| 7,686,555 B1 | 3/2010 | Larson et al. |
| 7,709,078 B1 | 5/2010 | Sevier et al. |
| 7,715,149 B1 | 5/2010 | Liebman et al. |
| 7,729,083 B2 | 6/2010 | Hatchett et al. |
| 7,729,091 B1 | 6/2010 | Huang et al. |
| 7,751,145 B1 | 7/2010 | Lin et al. |
| 7,826,177 B1 | 11/2010 | Zhang et al. |
| 7,852,601 B1 | 12/2010 | Little |
| 7,864,488 B1 | 1/2011 | Pan |
| 7,898,770 B1 | 3/2011 | Zhang et al. |
| 7,903,369 B1 | 3/2011 | Codilian et al. |
| 7,907,369 B1 | 3/2011 | Pan |
| 7,911,742 B1 | 3/2011 | Chang et al. |
| 7,926,167 B1 | 4/2011 | Liebman et al. |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,009,384 B1 | 8/2011 | Little |
| 8,018,687 B1 | 9/2011 | Little et al. |
| 8,031,431 B1 | 10/2011 | Berding et al. |
| 8,059,364 B1 | 11/2011 | Andrikowich et al. |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,100,017 B1 | 1/2012 | Blick et al. |
| 8,116,038 B1 | 2/2012 | Zhang et al. |
| 8,125,740 B1 | 2/2012 | Yang et al. |
| 8,142,671 B1 | 3/2012 | Pan |
| 8,156,633 B1 | 4/2012 | Foisy |
| 8,159,785 B1 | 4/2012 | Lee et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,203,806 B2 | 6/2012 | Larson et al. |
| 8,223,453 B1 | 7/2012 | Norton et al. |
| 8,228,631 B1 | 7/2012 | Tsay et al. |
| 8,233,239 B1 | 7/2012 | Teo et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,289,646 B1 | 10/2012 | Heo et al. |
| 8,300,352 B1 | 10/2012 | Larson et al. |
| 8,305,708 B2 | 11/2012 | Tacklind |
| 8,320,086 B1 | 11/2012 | Moradnouri et al. |
| 8,322,021 B1 | 12/2012 | Berding et al. |
| 8,345,387 B1 | 1/2013 | Nguyen |
| 8,363,351 B1 | 1/2013 | Little |
| 8,369,044 B2 | 2/2013 | Howie et al. |
| 8,411,389 B1 | 4/2013 | Tian et al. |
| 8,416,522 B1 | 4/2013 | Schott et al. |
| 8,416,534 B1 | 4/2013 | Heo et al. |
| 8,422,171 B1 | 4/2013 | Guerini |
| 8,422,175 B1 | 4/2013 | Oveyssi |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,467,153 B1 | 6/2013 | Pan et al. |
| 8,472,131 B1 | 6/2013 | Ou-Yang et al. |
| 8,477,460 B1 | 7/2013 | Liebman |
| 8,488,270 B2 | 7/2013 | Brause et al. |
| 8,488,280 B1 | 7/2013 | Myers et al. |
| 8,499,652 B1 | 8/2013 | Tran et al. |
| 8,514,514 B1 | 8/2013 | Berding et al. |
| 8,530,032 B1 | 9/2013 | Sevier et al. |
| 8,542,465 B2 | 9/2013 | Liu et al. |
| 8,547,664 B1 | 10/2013 | Foisy et al. |
| 8,553,356 B1 | 10/2013 | Heo et al. |
| 8,553,366 B1 | 10/2013 | Hanke |
| 8,553,367 B1 | 10/2013 | Foisy et al. |
| 8,593,760 B2 | 11/2013 | McGuire, Jr. |
| 8,616,900 B1 | 12/2013 | Lion |
| 8,665,555 B1 | 3/2014 | Young et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,717,706 B1 | 5/2014 | German et al. |
| 8,743,509 B1 | 6/2014 | Heo et al. |
| 8,755,148 B1 | 6/2014 | Howie et al. |
| 8,756,776 B1 | 6/2014 | Chen et al. |
| 8,760,800 B1 | 6/2014 | Brown et al. |
| 8,760,814 B1 | 6/2014 | Pan et al. |
| 8,760,816 B1 | 6/2014 | Myers et al. |
| 8,773,812 B1 | 7/2014 | Gustafson et al. |
| 8,780,491 B1 | 7/2014 | Perlas et al. |
| 8,780,504 B1 | 7/2014 | Teo et al. |
| 8,792,205 B1 | 7/2014 | Boye-Doe et al. |
| 8,797,677 B2 | 8/2014 | Heo et al. |
| 8,797,689 B1 | 8/2014 | Pan et al. |
| 8,824,095 B1 | 9/2014 | Dougherty |
| 8,824,098 B1 | 9/2014 | Huang et al. |
| 8,854,766 B1 | 10/2014 | Gustafson et al. |
| 9,001,458 B1 * | 4/2015 | Vitikkate et al. .......... 360/97.22 |
| 2005/0068666 A1 * | 3/2005 | Albrecht et al. ............ 360/97.02 |
| 2011/0212281 A1 | 9/2011 | Jacoby et al. |

(56) References Cited

U.S. PATENT DOCUMENTS

| | | |
|---|---|---|
| 2012/0275287 A1 | 11/2012 | McGuire, Jr. et al. |
| 2013/0038964 A1 | 2/2013 | Garbarino et al. |
| 2013/0091698 A1 | 4/2013 | Banshak, Jr. et al. |
| 2013/0155546 A1 | 6/2013 | Heo et al. |
| 2013/0290988 A1 | 10/2013 | Watson et al. |

* cited by examiner

HARD DISK DRIVE ENCLOSURE BASE WITH FEED THROUGH FLEXURE DESIGN AND ACCOMPANYING FLEXURE

CROSS-REFERENCE TO RELATED APPLICATIONS

This application claims benefit of priority from Provisional U.S. Patent application Ser. No. 62/171,848, filed Jun. 5, 2015, the contents of which are incorporated by reference.

BACKGROUND

The introduction of lasers to heads in some types of storage drives may increase oxidation within the storage drive. Using inert gases, such as Helium, to fill the storage drive may allow safer operation by reducing oxidation within the drive. Additionally, the reduced density of inert gas may also reduce the aerodynamic drag and allow the head to fly at lower heights, which may in turn save power consumption and reduce vibration and/or friction. However, introduction of maintaining inert gases within the drive may require improved sealing of the drive while still allowing electrical connection between the exterior of the drive and the internal electronics within the housing.

BRIEF DESCRIPTION OF THE DRAWINGS

A general architecture that implements features of the disclosure will now be described with reference to the drawings. The drawings and the associated descriptions are provided to illustrate embodiments of the disclosure and not to limit the scope of the disclosure. Through the drawings, reference numbers are reused to indicate correspondence between referenced elements.

DETAILED DESCRIPTION

The subject matter described herein is taught by way of example embodiments. Various details may be omitted for the sake of clarity and to avoid obscuring the subject matter described.

Figure 1:
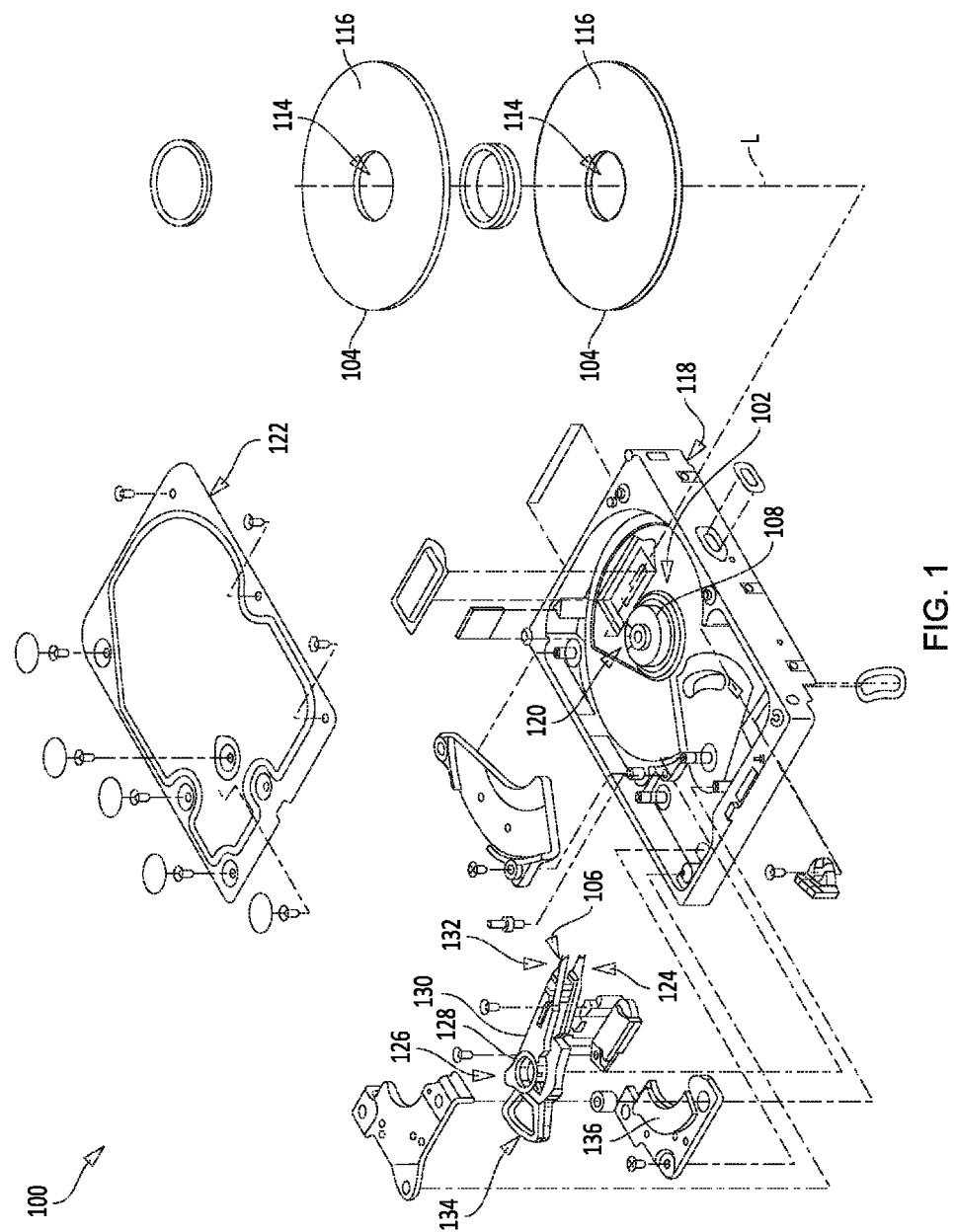
FIG. 1 is an exploded, perspective view generally illustrating storage device.

FIG. 1 is an exploded, perspective view generally illustrating storage device 100. Referring to FIG. 1, a storage device 100 is illustrated, according to one embodiment. The storage device 100 comprises a hub 102, a media 104 physically contacting and supported by at least one mounting surface (not labeled) of the hub 102, and a head 106 operable to write to and read from the media 104. In one embodiment, the hub 102 comprises a substantially cylindrical portion 108 which defines a longitudinal axis L and a mounting surface substantially normal to the longitudinal axis L, the mounting surface extending radially outward.

As illustrated in FIG. 1, a storage device 100 comprises a magnetic disk drive, and the structures and methods described herein will be described in terms of such a disk drive. However, these structures and methods may also be applied to and/or implemented in other storage devices, including, e.g., solid-state hybrid drives (SSHD), optical and magneto-optical disk drives. Solid-state hybrid drives may additionally include non-volatile memory (e.g., flash).

The media 104 may comprise any of a variety of magnetic or optical disk media having a substantially concentric opening 114 defined there through. Of course, in other embodiments, the storage device 100 may include more or fewer disks. For example, the storage device 100 may include one disk or it may include two or more disks. The media 104 each include a disk surface 116, as well as an opposing disk surface not visible in FIG. 1 above. In one embodiment, the disk surfaces 116 comprise a plurality of generally concentric tracks for storing data.

As illustrated, the hub 102 may be coupled to and support the media 104. The hub 102 may also be rotatably attached to a storage drive base 118 of the storage device 100, and may form one component of a motor 120 (e.g., a spindle motor). The motor 120 and the hub 102 may be configured to rotate the media 104 about the longitudinal axis L.

Further, a disk clamp may be coupled to the hub 102 to provide a downward clamping force to the media 104. Specifically, the disk clamp may be positioned above the media 104 and attached to an upper surface of the hub 102. The interaction of the disk clamp and the hub 102 provides downward clamping force.

The storage device 100 may further include a cover 122, which, together with the storage drive base 118, may for a sealed enclosure to house the media 104 and the motor 120. The storage device 100 may also include a head stack assembly ("HSA") 124 rotatably attached to the storage drive base 118. The HSA 124 may include an actuator 126 comprising an actuator body 128 and one or more actuator arms 130 extending from the actuator body 128. The actuator body 128 may further be configured to rotate about an actuator pivot axis.

One or two head gimbal assemblies ("HGA") 132 may be attached to a distal end of each actuator arm 130. Each HGA 132 includes a head 106 operable to write to and read from a corresponding media 104. The HSA 124 may further include a coil 134 through which a changing electrical current is passed during operation. The coil 134 interacts with one or more magnets 136 that are attached to the storage drive base 118 to form a voice coil motor ("VCM") for controllably rotating the HSA 124.

The head 106 may comprise any of a variety of heads for writing to and reading from a media 104. In magnetic recording applications, the head 106 may include an air bearing slider and a magnetic transducer that includes a writer and a read element. The magnetic transducer's writer may be of a longitudinal or perpendicular design, and the read element of the magnetic transducer may be inductive or magneto resistive. In optical and magneto-optical recording applications, the head 106 may include a mirror and an objective lens for focusing laser light on to an adjacent disk surface.

The storage device 100 may further include a printed circuit board ("PCB") (not shown in FIG. 1) external to the storage drive base 118. The PCB may include, inter alia, a storage device controller for controlling read and write operations and a servo control system for generating servo control signals to position the actuator arms 130 relative to the media 104. In order to provide electrical signals from the PCB to the actuator arms 130, an electrical circuit connector passes through the storage drive base.

Figure 2:
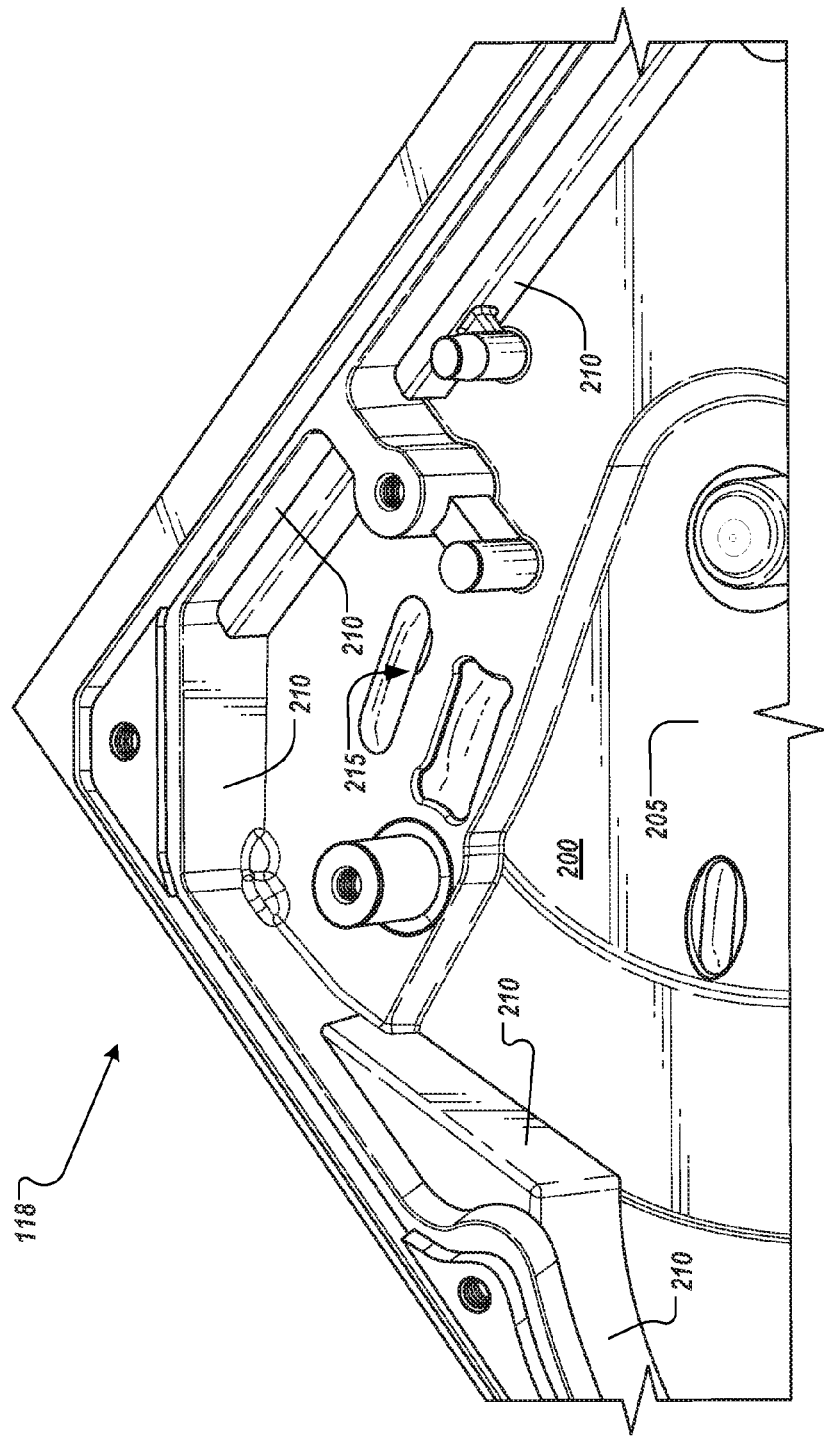
FIG. 2 is a perspective view of an interior of a storage drive base according to an example embodiment of the present application.

FIG. 2 is a perspective view of an interior 200 of a storage drive base 118 according to an example embodiment of the present application. As illustrated, the storage drive base 118 includes a floor 205 (e.g., a bottom surface) and a plurality of side walls 210 (e.g., side surfaces), which define the hollow interior 200. The hollow interior 200 may house the internal components of the storage drive 100 illustrated in FIG. 1. In FIG. 2, the internal components have been omitted to illustrate aspects of the storage drive base 118.

In the illustrated embodiment, the storage drive base 118 also includes slotted aperture 215 formed through the floor 205 to the exterior (400 illustrated in FIG. 4) of the storage drive base 118. As illustrated, the slotted aperture 215 may have an elongated, elliptical shape. However, example implementations are not limited to this configuration, and the slotted aperture 215 may have other shapes that may be apparent to a person of ordinary skill in the art. Further, in other example implementations, the slotted aperture 215 may be formed through one or more of the plurality of side walls 210, or may be formed in any other configuration that may be apparent to a person of ordinary skill in the art.

Figure 3:
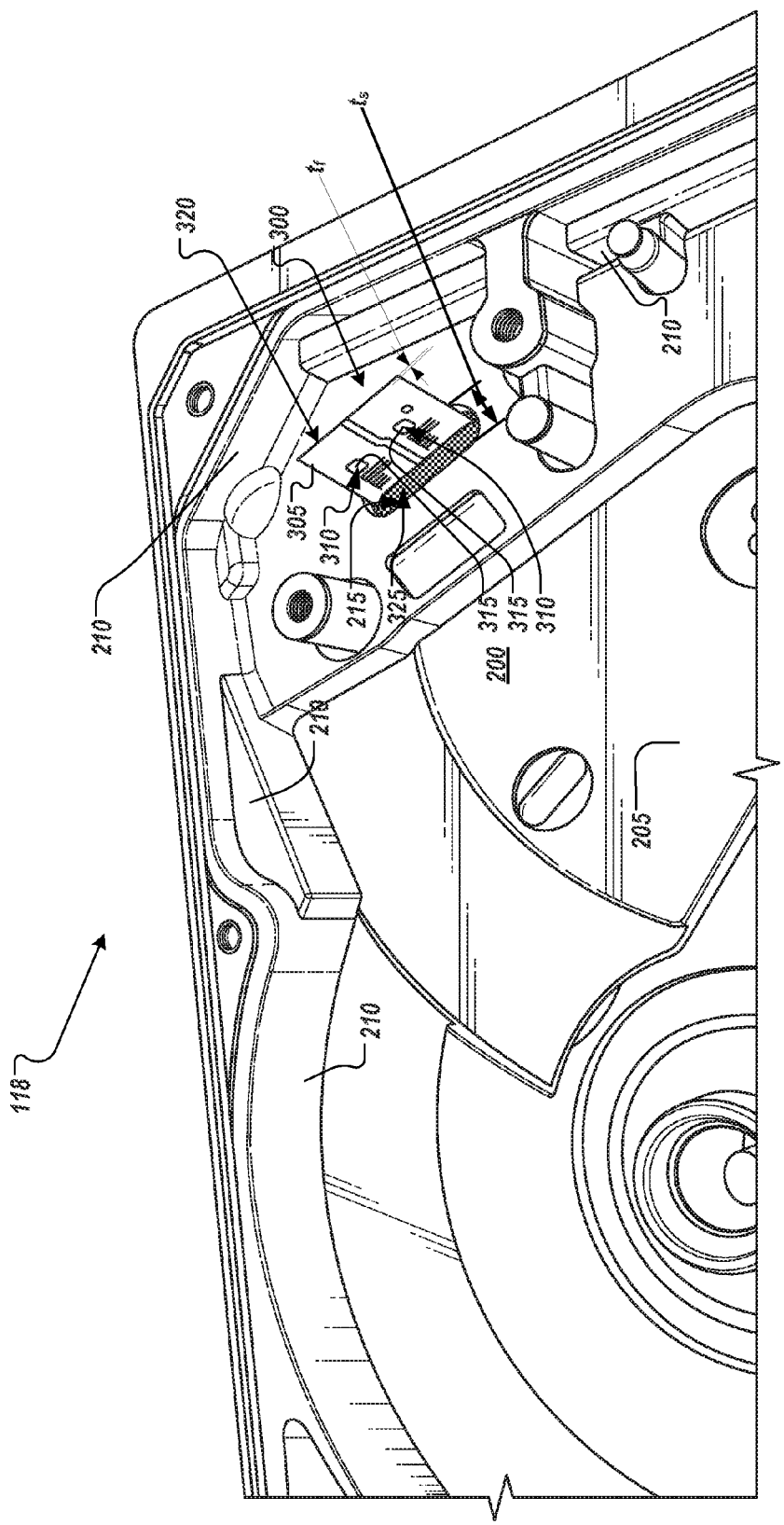
FIG. 3 is a perspective view of the interior of a storage drive base with a flexible circuit installed according to the example embodiment of the present application.

FIG. 3 is a perspective view of the interior 200 of a storage drive base 118 with a flexible circuit 300 installed according to an example embodiment of the present application. As illustrated, the flexible circuit 300 is inserted through the slotted aperture 215 to extend into the interior 200 of the storage drive base 118. The slotted aperture 215 is sized to allow the flexible circuit 300 to pass through during manufacturing and assembly of the storage drive 100. In some example embodiments, the slotted aperture 215 may have thickness $t_s$ that is at least 1.1 times (i.e. 110% of) a thickness $t_f$ of the flexible circuit 300. Further, in some embodiments, the slotted aperture 215 may have a thickness $t_s$ that is not more than 10 times (i.e. 1000% of) the thickness $t_f$ of the flexible circuit 300.

The flexible circuit 300 includes a substrate 305 formed from a non-conductive material, such a plastic, resin, or any other non-conductive material that may be apparent to a person of ordinary skill in the art. The flexible circuit 300 also includes one or more conductive electrodes 310 running through the flexible circuit 300 from an interior end 320 to an exterior end (420 illustrated in FIG. 4) allowing electrical communication between the interior end 320 and the exterior end (420 illustrated in FIG. 4).

An interior contact pad 315 may be provided at the interior end 320 of each electrode 310 of the flexible circuit 300. In some embodiments, the interior contact pad 315 may be electrically connected to an internal component, such as an HSA (not illustrated), a PCB (not illustrated), a spindle motor, or any other internal component of the storage drive that may require electrical power or electrical signals. The material construction of the electrodes 310 and interior contact pads 315 of the flexible circuit 300 are not particularly limited and may include gold, silver, copper, or any other conductive material that may be apparent to a person of ordinary skill in the art.

Figure 4:
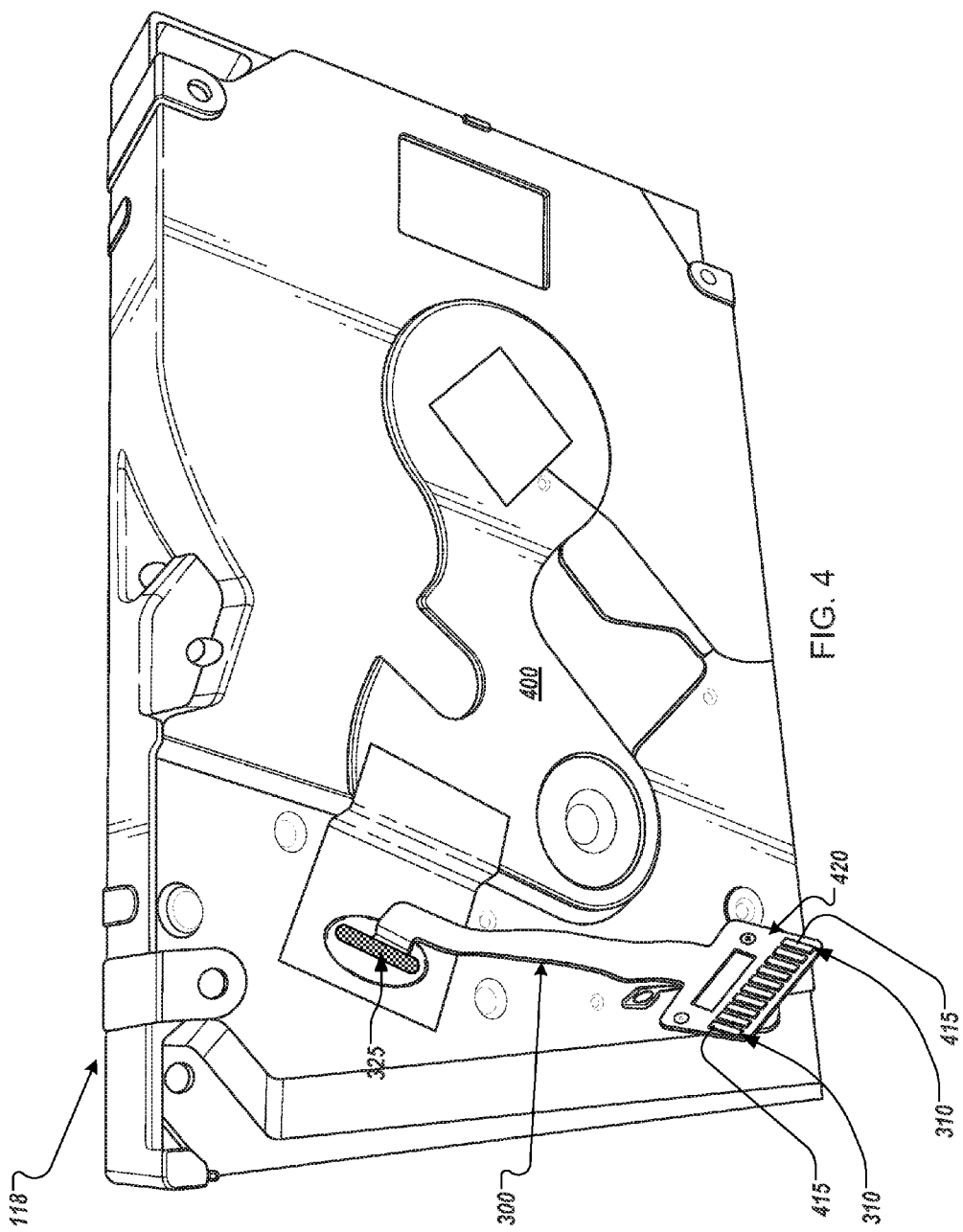
FIG. 4 is a perspective view of an exterior of the storage drive base illustrating the flexible circuit entering the slotted aperture according to the example embodiment of the present application.

In some embodiments, the slotted aperture 215 may be filed with a sealing-adhesive 325 to form a barrier around the flexible circuit 300 to create a hermetic seal between the interior 200 of the storage drive base 180 and the exterior (400 illustrated in FIG. 4). The sealing-adhesive 325 is not particularly limited and may include a thermally-cured adhesive, a UV-cured adhesive, an air-cured adhesive, or any other sealing compound that may be apparent to a person of ordinary skill in the art. In some implementation, the sealing-adhesive 325 may also be a clean-room approved adhesive suitable for application in a clean-room environment.

FIG. 4 is a perspective view of an exterior 400 of the storage drive base 118 illustrating the flexible circuit 300 entering the slotted aperture 215 according to an example embodiment of the present application. As discussed above, the flexible circuit 300 is inserted through the slotted aperture 215 with an exterior end 420 of the flexible circuit 300 located on the exterior 400 side of of the storage drive base 118. In FIG. 4, the exterior end 420 of the flexible circuit 300 is illustrated with a long length relative to the dimensions of the slotted aperture. However, configurations of the present application are not limited to this configuration and may have shortened lengths relative to the dimensions of the slotted aperture (as illustrated in FIGS. 5A-5D and 6A-B), as may be apparent to a person of ordinary skill in the art.

The exterior end 420 also includes a plurality of exterior contact pads 415, which are coupled to the interior contact pads 315 to allow electrical communication therebetween. In some embodiments, the exterior contact pad 415 may be electrically connected to a component, such as a PCB, power supply or any other external component of the storage drive that may require electrical power or electrical signals. In some example embodiments, the exterior contact pads 415 may be oriented on one side of a flat portion of the flexible circuit 300 to allow the exterior contact pads 415 to be electrically connected to by a compression connector, as may be apparent to a person of ordinary skill in the art. The shape and structure of the compression connector is not particularly limited. Further, the material construction of exterior contact pads 415 of the flexible circuit 300 are not particularly limited and may include gold, silver, copper, or any other conductive material that may be apparent to a person of ordinary skill in the art.

Figure 5A:
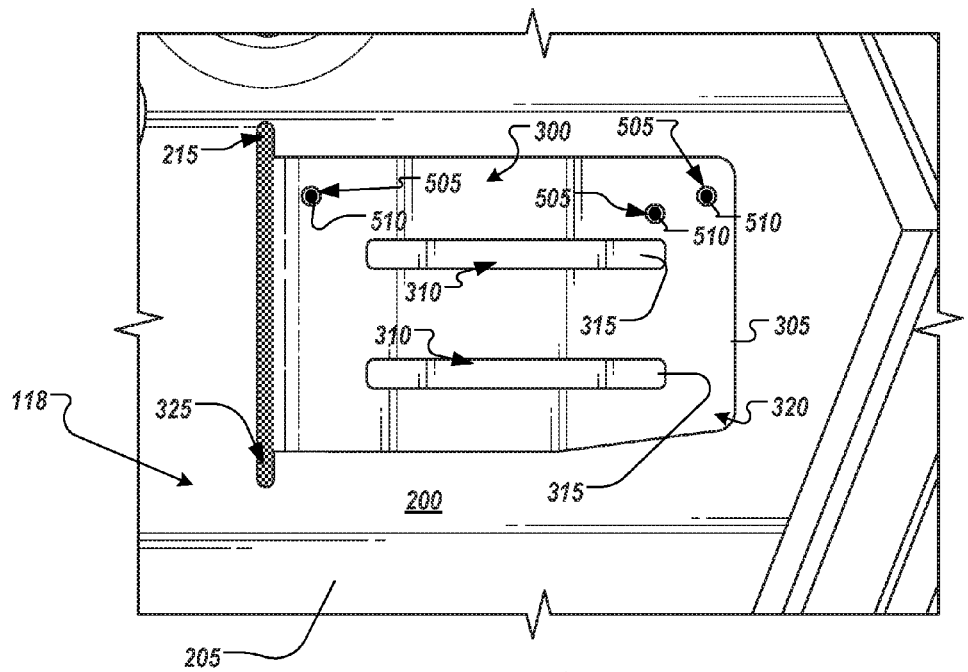
FIG. 5A is a top view of the flexible circuit inserted through the slotted aperture formed through the storage drive base according to a second example embodiment of the present application.

FIG. 5A is a top view of the flexible circuit 300 inserted through the slotted aperture 215 formed through the storage drive base 118 according to a second example embodiment of the present application. This illustrated embodiment is similar to the embodiment discussed above, similar reference numerals may be used for familiar components, and redundant descriptions may be omitted. After flexible circuit 300 has been inserted through the slotted aperture 215, the interior end 320 may be bent downward to contact the floor 205 of the storage drive base 118. In some implementations, the interior end 320 of the flexible circuit 300 may have a plurality of alignment holes 505 that fit over a series of protrusions 510 formed on the floor 205 to align the interior end 320 of the flexible circuit 300 with the storage drive base 118. In some example embodiments, the interior end 320 of the flexible circuit 300 may be attached to the floor 205 using an attachment process. For example, a double-sided adhesive member or sealing gasket may be used to attach the interior end 320 of the flexible circuit 300 to the floor 205. Such a configuration may eliminate a need to form a bracket or other conventional retaining feature on an interior 200 of the storage drive base 118, which can save space within the storage drive 100. However, example embodiments of the present application are not limited to this configuration and may have other alignment feature configurations that may be apparent to a person of ordinary skill in the art.

As illustrated, when the flexible circuit 300 is bent downward to contact the floor 205, the interior contact pads 315 of the electrodes 310 are oriented to face away from the floor (i.e. upward). In this configuration, an electrical connection can be established with the interior contact pads 315 using a compression connector configured to apply a vertical pressure to the flexible circuit 300. However, embodiments of the present application are not limited to this configuration and may use other methods of electrical connection that may be apparent to a person of ordinary skill in the art.

Figure 5B:
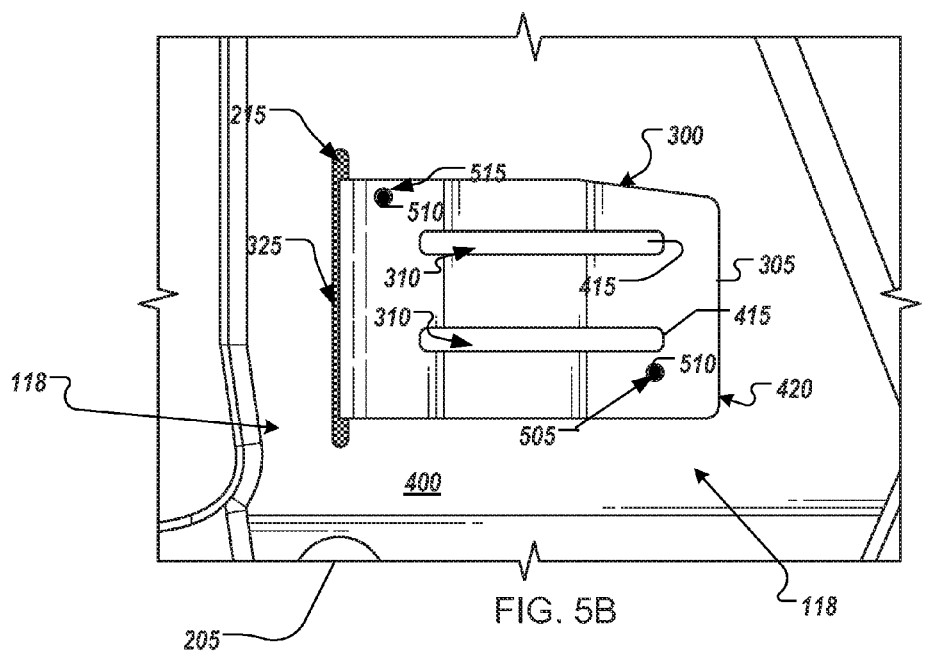
FIG. 5B is a bottom view of a flexible circuit inserted through a slotted aperture formed through the storage drive base (viewed from outside the storage drive base) according to according to the second example embodiment of the present application.

FIG. 5B is a bottom view of a flexible circuit 300 inserted through a slotted aperture 215 formed through the storage drive base 118 (viewed from outside the storage drive base 118) according to according to the second example embodiment of the present application. After flexible circuit 300 has been inserted through the slotted aperture 215, the exterior end 420 may be bent upward to contact the exterior 400 of the floor 205 of the storage drive base 118. In some implementations, the exterior end 420 of the flexible circuit 300 may have a plurality of alignment holes 515 that fit over a series of protrusions 520 formed on the exterior 400 of the storage drive base 118 to align the exterior end 420 of the flexible circuit 300 with the storage drive base 118. Example embodiments of the present application are not limited to this configuration and may have other alignment feature configurations that may be apparent to a person of ordinary skill in the art.

As illustrated, when the flexible circuit 300 is bent upward to contact the exterior 400 of the floor 205, the exterior contact pads 415 of the electrodes 310 are oriented to face away from the floor 205 (i.e. downward). In this configuration, an electrical connection can be established with the exterior contact pads 415 using a compression connector configured to apply a vertical pressure to the flexible circuit 300. However, embodiments of the present application are not limited to this configuration and may use other methods of electrical connection that may be apparent to a person of ordinary skill in the art.

Figure 5C:
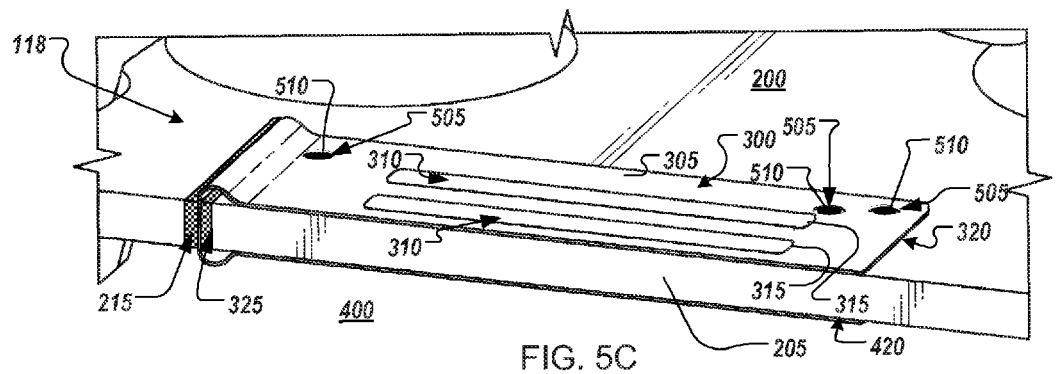
FIG. 5C is a cross-sectional view of the flexible circuit illustrating the exterior (outside of the storage drive base) and the interior (inside of the storage drive base) according to the second example embodiment of the present application.

FIG. 5C is a cross-sectional view of the flexible circuit 300 illustrating the exterior 400 (outside of the storage drive base 118) and the interior 200 (inside of the storage drive base 118) according to the second example embodiment of the present application. As illustrated, the interior end 320 and the exterior end 420 of the flexible circuit 300 have both been bent toward the floor 205 of the storage drive base 118. In this configuration, both the interior end 320 and the exterior end 420 extend substantially parallel to the floor 205. In some example embodiments, the interior end 320 and the exterior end 420 of the flexible circuit 300 may also contact the floor 205. As illustrated, the sealing-adhesive 325 completely fills in the slotted aperture 215 on both sides of the flexible circuit 300.

Figure 5D:
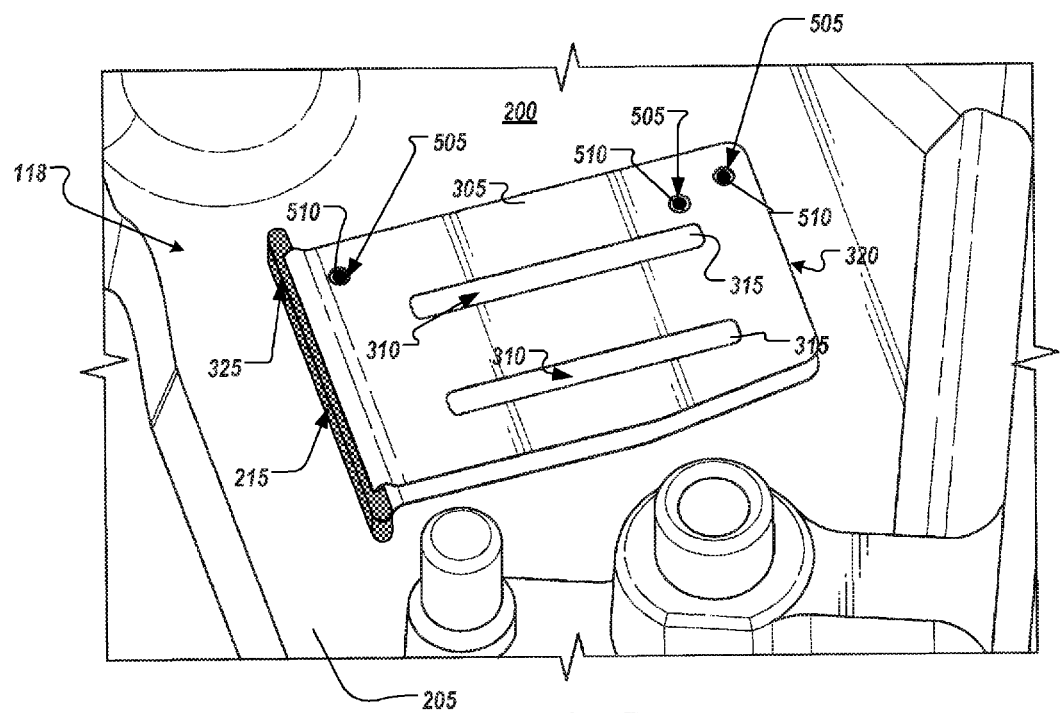
FIG. 5D is perspective view of the flexible circuit fed through a slotted aperture of the storage drive base according to the second example embodiment of the present application.

FIG. 5D is perspective view of the flexible circuit 300 fed through a slotted aperture 215 of the storage drive base 118 according to the second example embodiment of the present application. Again, as illustrated, the interior end 320 of the flexible circuit 300 may include a plurality of alignment holes 505 and a series of protrusions 510 formed on the floor 205 extend up through the alignment holes 505 to align the interior end 320 of the flexible circuit 300 with the storage drive base 118. In some embodiments, the flexible circuit 300 may be positioned to contact the floor 205 such that the interior contact pads 315 of the electrodes 310 are oriented to face upward from the floor 205. Orienting the interior contact pads 315 upward from the floor 205 may allow a compression connector to connect to the interior contact pads 315. However, embodiments of the present application are not limited to this configuration and may have other configurations that may be apparent to a person ordinary skill in the art. For example, the flexible circuit 300 may be positioned to contact one or more of the plurality of side walls 210 or some other structure formed in the interior 200 of the storage drive base 118.

Figure 6A:
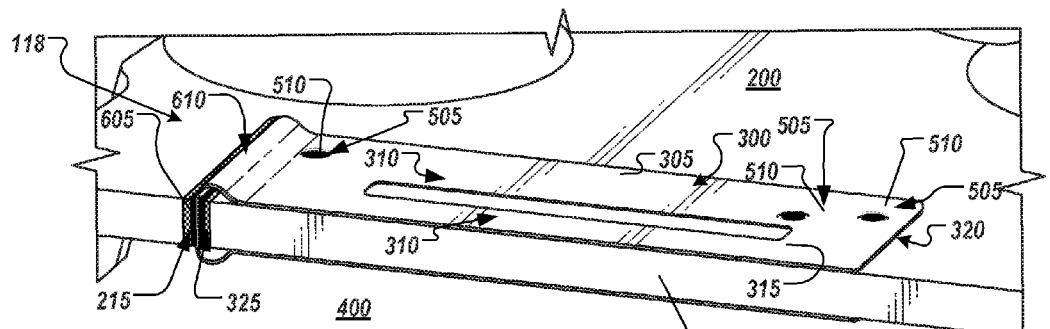
FIG. 6A is a cross-sectional view of the flexible circuit illustrating the exterior (outside of the storage drive base) and an interior (inside of the storage drive base) according to a third example embodiment.
Figure 6B:
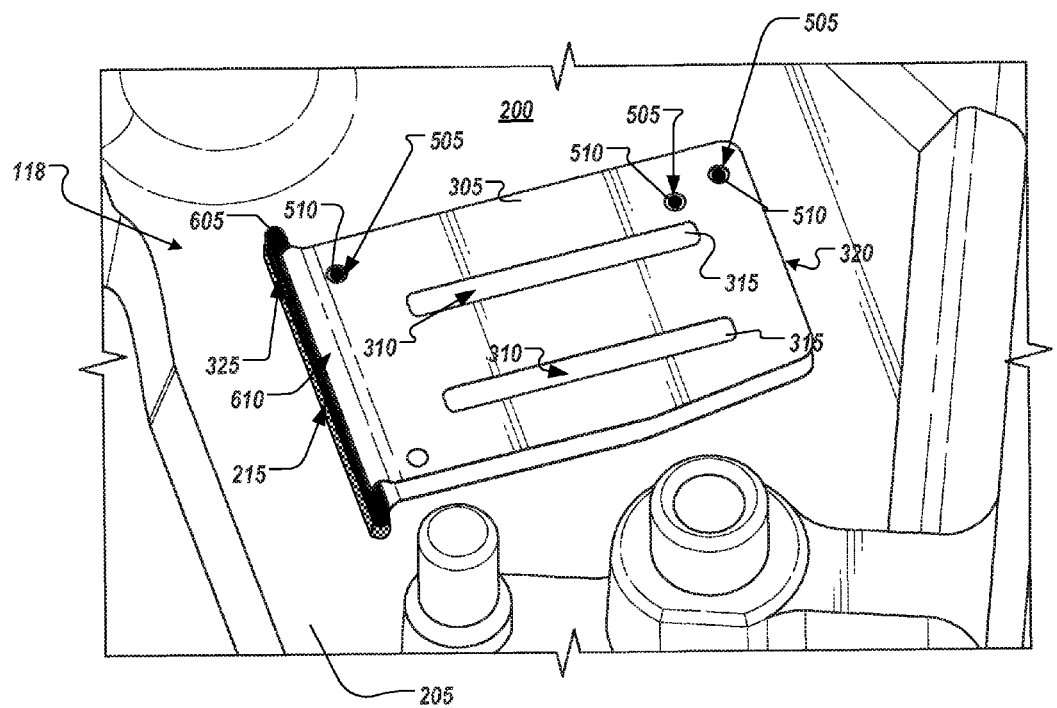
FIG. 6B is a perspective view of the flexible circuit fed through a slotted aperture of the storage drive base according to the third example embodiment.

FIG. 6A is a cross-sectional view of the flexible circuit 300 illustrating the exterior 400 (outside of the storage drive base 118) and an interior 200 (inside of the storage drive base 118) according to a third embodiment. Further, FIG. 6B is a perspective view of the flexible circuit 300 fed through a slotted aperture 215 of the storage drive base 118 according to the third embodiment. This illustrated embodiment is similar to the embodiments discussed above, similar reference numerals may be used for familiar components, and redundant descriptions may be omitted. In this embodiment, the flexible circuit 300 also includes a circuit housing member 605 surrounding a central portion 610 of the flexible circuit 300. The circuit housing member 605 extends outward from the central portion 610 to partially fill the slotted aperture 215. Once inserted into the slotted aperture 215, the circuit housing member 605 is surrounded by the sealing-adhesive 325 to form a hermetic seal between the flexible circuit 300 and the storage drive base 118. Again, once sealed in the slotted aperture, the interior end 320 of the flexible circuit 300 may be bent downward to contact the floor 205 of the storage drive base 118 and align a plurality of alignment holes 505 with the series of protrusions 510 formed in the floor 205 of the storage drive base 118. However, example embodiments of the present application are not limited to this configuration and may have other alignment feature configurations that may be apparent to a person of ordinary skill in the art. For example, the exterior 400 may have clips, brackets, or any other alignment feature that may be apparent to a person of ordinary skill in the art.

Further, after the sealing-adhesive 325 is applied between circuit housing member 605 and the slotted aperture, the exterior end 420 of the flexible circuit may be bent upward to contact the exterior 400 of the floor 205 of the storage drive base 118. However, embodiments of the present application are not limited to this configuration and may have other configurations that may be apparent to a person ordinary skill in the art. For example, the flexible circuit 300 may be positioned to contact the exterior 400 of one or more of the plurality of side walls 210 or some other structure formed on the exterior 400 of the storage drive base 118.

Figure 7:
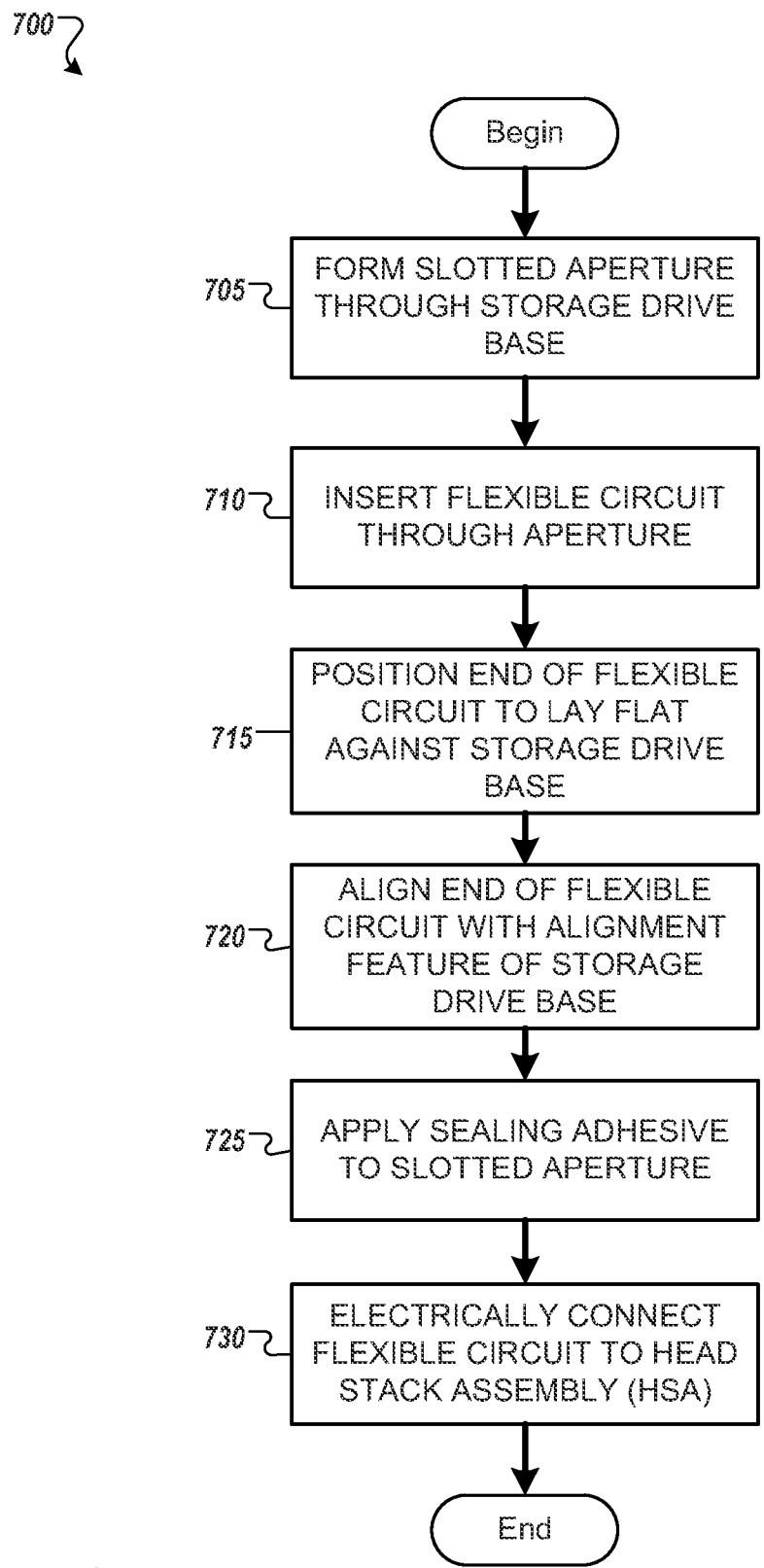
FIG. 7 is a flow chart illustrating a method of manufacturing a storage drive according to an embodiment of the present application.

FIG. 7 is a flow chart illustrating a method 700 of manufacturing a storage drive according to an embodiment of the present application. This method 700 will be discussed in the context of the storage drive 100 having the storage drive base 118 illustrated in FIGS. 1-6B and discussed above. However, the acts disclosed herein may be executed in accordance with the described method 700 to manufacture any storage drive as may be apparent to a person of ordinary skill in the art.

As described herein, at least some of the acts comprising the method 700 may be orchestrated by a processor according to an automatic storage drive manufacturing algorithm, based at least in part on computer-readable instructions stored in computer-readable memory and executable by the processor. A manual implementation of one or more acts of the method 700 may also be employed, in other embodiments. Also, some acts may be combined into fewer acts or divided into additional acts, and the order of the acts may be changed in some embodiments.

At act 705, a slotted aperture (e.g., slotted aperture 215) is formed through a storage drive base (e.g., storage drive base 118). The slotted aperture 215 may be formed through a variety of methods, including drilling, milling, cutting, etc. The slotted aperture 215 may be formed to have a variety of shapes including a circular shape, an elliptical shape, a square shape, a rectangular shape, or any other shape that may be apparent to a person of ordinary skill in the art. In some example embodiments, the forming of the slotted aperture 215 may be performed via automated-computer-controlled manufacturing equipment. In other example embodiments, the forming of the slotted aperture 215 may be performed under partial or total human control, as may be apparent to a person of ordinary skill in the art.

At act 710, a flexible circuit (e.g., the flexible circuit 300) is inserted through the slotted aperture 215 of the storage drive base 118. In some embodiments, the insertion of the flexible circuit 300 may be performed using computer controlled manufacturing equipment as may be apparent to a person of ordinary skill in the art. In other example embodiments, the flexible circuit 300 may be performed under partial or full human control. Further, in some example embodiments, the insertion of the flexible circuit 300 may be assisted by a machine vision system.

At act 715, after the end of the flexible circuit 300 is inserted through the slotted aperture 215, the end of the flexible circuit 300 may be bent down to lay flat against an interior surface (e.g., the floor 205) of the storage drive base 118. In some example implementations, the bending down may also be performed using computer controlled manufacturing equipment as may be apparent to a person of ordinary skill in the art. In other example embodiments, bending of the flexible circuit 300 may be performed under partial or full human control.

At act 720, during the bending of the flexible circuit 300, the flexible circuit 300 may be aligned with an alignment feature provided on the floor 205 of the storage drive base 118. For example, in some example embodiments, a one or more of a plurality of openings (e.g., alignment holes 505) of the flexible circuit 300 may be aligned with one or more corresponding protrusions (e.g., protrusions 510) provided on the storage drive base 118. In other example embodiments, alternative alignment features may be used. Further, in some example embodiments, the alignment of the flexible circuit 300 with the alignment feature on the floor 205 of the storage drive base 118 may be assisted by a machine vision system.

At act 725, a sealing-adhesive (e.g., sealing-adhesive 325) is applied between flexible circuit 300 and the slotted aperture 215 to form a hermetic seal. The sealing-adhesive 325 may be applied using an automated, computer controlled dispenser or may be applied using a user controlled dispenser. Further, in some example embodiments, a curing process (e.g., thermal-curing, UV-curing, air-curing, etc.) may also be applied to the sealing-adhesive 325 to form the hermetic seal.

After the sealing-adhesive 325 has been applied and cured, the flexible circuit 300 may be electrically connected to a head stack assembly (e.g., HSA 124) within the storage drive assembly 118 at act 730. The electrical connection may be performed via soldering, wire bonding, laser welding, sonic welding, or any other electrical connecting process that may be apparent to a person of ordinary skill in the art. The electrical connection may also be performed by inserting the flexible circuit 300 into a connector, such as a press connector, compression connector, or any other connector that may be apparent of ordinary skill in the art.

The foregoing detailed description has set forth various embodiments of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof.

While certain embodiments have been described, these embodiments have been presented by way of example only, and are not intended to limit the scope of the protection. Indeed, the novel methods and apparatuses described herein may be embodied in a variety of other forms. Furthermore, various omissions, substitutions, and changes in the form of the methods and systems described herein may be made without departing from the spirit of the protection. The accompanying claims and their equivalents are intended to cover such forms or modifications as would fall within the scope and spirit of the protection.

We claim:

1. A storage drive base having an interior side and an exterior side, the storage drive base comprising:
   a slotted aperture passing through the storage drive base from the interior side to the exterior side;
   a flexible circuit having a first end disposed on the interior side of the storage drive base and a second end disposed on the exterior side of the storage drive base,
   wherein the first end of the flexible circuit is installed through the slotted aperture and aligned so that the first end lays flat along an interior surface of the storage drive base in a location proximal to the slotted aperture, and
   wherein the first end of the flexible circuit includes at least one exposed interior electrode contact pad exposed to the interior of the storage drive base; and
   a sealing-adhesive barrier, applied between edges of the slotted aperture and the flexible circuit, to form a hermetic seal between the exterior side and the interior side of the storage drive base.

2. The storage drive base of claim 1, wherein the second end of the flexible circuit includes at least one exposed exterior electrical circuit contact communicatively coupled to the at least one exposed interior electrode contact pad.

3. The storage drive base of claim 2, wherein the first end of the flexible circuit is oriented such that the at least one exposed interior electrode contact pad faces away from the storage drive base.

4. The storage drive base of claim 2, further comprising a printed circuit board including a compression connector electrically connected to the at least one exposed interior electrode contact pad.

5. The storage drive base of claim 1, further comprising an alignment feature provided on the storage drive base configured to mechanically align with a corresponding alignment feature provided on the first end of the flexible circuit.

6. The storage drive base of claim 1, further comprising a circuit housing member surrounding the flexible circuit, the circuit housing member configured to be inserted into the slotted aperture.

7. The storage drive base of claim 1, wherein the slotted aperture has a thickness at least 1.1 times the thickness of the first end of the flexible circuit; and
wherein thickness of the slotted aperture is no more than 10 times the thickness of the first end of the flexible circuit.

8. A storage drive housing comprising the storage drive base of claim 1.

9. A storage drive comprising:
a storage media;
a spindle motor for rotating the storage media;
a head stack assembly (HSA);
a flexible circuit having a first end electrically connected to the HSA and a second end; and
a storage drive housing comprising:
a storage drive base having
an interior side, wherein the storage media and the HSA are disposed on the interior side, and
an exterior side, the storage drive base comprising:
a slotted aperture passing through the storage drive base from the interior side to the exterior side,
wherein the first end of the flexible circuit is installed through the slotted aperture and aligned so that the first end lays flat along an interior surface of the storage drive base in a location proximal to the slotted aperture,
wherein the first end of the flexible circuit is disposed on the interior side of the storage drive base and the second end of the flexible circuit is disposed on the exterior side of the storage drive base and
wherein the first end of the flexible circuit includes at least one exposed interior electrode contact pad exposed to the interior of the storage drive base; and
a sealing-adhesive barrier, applied between edges of the slotted aperture and the flexible circuit, to form a hermetic seal between the exterior side and the interior side of the storage drive base.

10. The storage drive of claim 9, further comprising a printed circuit board assembly (PCBA) disposed on the exterior side of the storage drive housing.

11. The storage drive of claim 10, wherein the at least one interior electrode contact pad is connected to the HSA;
wherein the second end of the flexible circuit includes at least one exterior electrode contact pad communicatively coupled to the at least one exposed interior electrode contact pad; and
wherein the at least one exterior electrode contact pad is connected to the PCBA.

12. The storage drive of claim 11, wherein the at least one of the first end of the flexible circuit and the second end of the flexible circuit includes a compression connector, and
wherein the compression connector connects the flexible circuit to at least one of the PCBA and the HSA.

13. The storage drive of claim 9, wherein the at least one interior electrode contact pad is connected to the HSA; and
wherein the second end of the flexible circuit includes at least one exterior electrode contact pad communicatively coupled to the at least one exposed interior electrode contact pad.

14. The storage drive of claim 13, wherein the first end of the flexible circuit is laid flat along the interior side of the storage drive base.

15. The storage drive of claim 13, wherein the first end of the flexible circuit is connected to the HSA by a compression connection.

16. The storage drive of claim 9, further comprising an alignment feature provided on the storage drive base configured to mechanically align with a corresponding alignment feature provided on the first end of the flexible circuit.

17. The storage drive of claim 9, further comprising a circuit housing member surrounding the flexible circuit, the circuit housing member configured to be inserted into the slotted aperture.

18. The storage drive of claim 9, wherein the slotted aperture has a thickness at least 1.1 times the thickness of the first end of the flexible circuit; and
wherein thickness of the slotted aperture is no more than 10 times the thickness of the first end of the flexible circuit.

* * * * *